April 24, 1962 W. O. STANTON 3,031,536

MULTIPLE COIL ELECTROMAGNETIC SOUND REPRODUCER

Filed Nov. 27, 1957

INVENTOR
Walter. O. Stanton
BY
Kane, Dalsimer and Kane
ATTORNEYS

United States Patent Office 3,031,536

Patented Apr. 24, 1962

3,031,536 MULTIPLE COIL ELECTROMAGNETIC SOUND REPRODUCER

Walter O. Stanton, Wantagh, N.Y., assignor to Pickering & Company, Inc., Audio Laboratories, Plainview, Long Island, N.Y., a corporation of New York Filed Nov. 27, 1957, Ser. No. 699,404
2 Claims (Cl. 179—100.41)

This invention relates to an improved sound reproducer and phonograph pickup of the magnetic type and more particularly of the type having a magnetic coupling element as described and claimed in my co-pending application, Serial No. 450,292, filed August 17, 1954, which issued as U.S. Patent No. 2,917,590, December 15, 1959.

In modern high fidelity phonograph systems, the usual form of phonograph pickup unit is such that vibrations of the stylus are made to generate an electromotive force, the value of which is varied in accordance with the movement of the stylus. In these units the electromotive force is generated by the movement of an armature disposed in a magnetic path. This armature is attached to the stylus which is in contact with the record to be sensed and which has its movements translated into electromotive force in coils at the pickup head by means of the movement of the armature. The voltage induced is then fed to an amplifier which amplifies the electrical signals until they are of sufficient magnitude to produce sound waves and then these signals are applied to an acoustic output device such as a speaker.

It is well known in the art that coils disposed in space develop voltage thereon due to extraneous signals cutting across the coils. If these coils are to be used to sense or transmit intelligence at low voltage levels it is necessary that this voltage generated by the extraneous signals be eliminated or reduced to a minimum. These extraneous signals are commonly called "noise signals." Various techniques are used to accomplish noise reduction. Thus, in complex electrical equipment, wires are shielded and coils are enclosed in non-conducting boxes, which isolate these coils from the surrounding atmosphere.

In electromagnetic phonograph pickup units, the pickup coils are, for best results, located in close proximity to the stylus. Therefore, it is difficult to mechanically shield these coils. If the noise voltage is of high intensity, the voltage transmitted to the amplifier will contain a large percentage of noise signals which will operate on the acoustic output device to give audio sounds which are not in conformity with the record being sensed.

The invention herein disclosed has as its principal object the provision of an electromagnetic sound reproducer with which high fidelity signals on a phonograph record may be sensed with a minimum of noise present.

Another object of this invention is to provide a new phonograph pickup with which minute movements of the stylus may be sensed by a replaceable stylus assembly which is insertable in a magnetic coupling member.

A further object of this invention is to provide a pickup having a compact structure which defines a magnetic path.

Still another object of the present invention is the provision of an extremely accurate reproducer of sound which is of relatively simple construction so that it is inexpensive to manufacture.

These and other objects are accomplished by utilization of a multiple coil pickup system in which pickup coils are connected in series aiding for signals and series opposed for noise rejection.

The construction of the pickup and the manner of using the same is described herein with reference to the drawings in which.

Figures 1, 2, 3, 4, 5, 6:
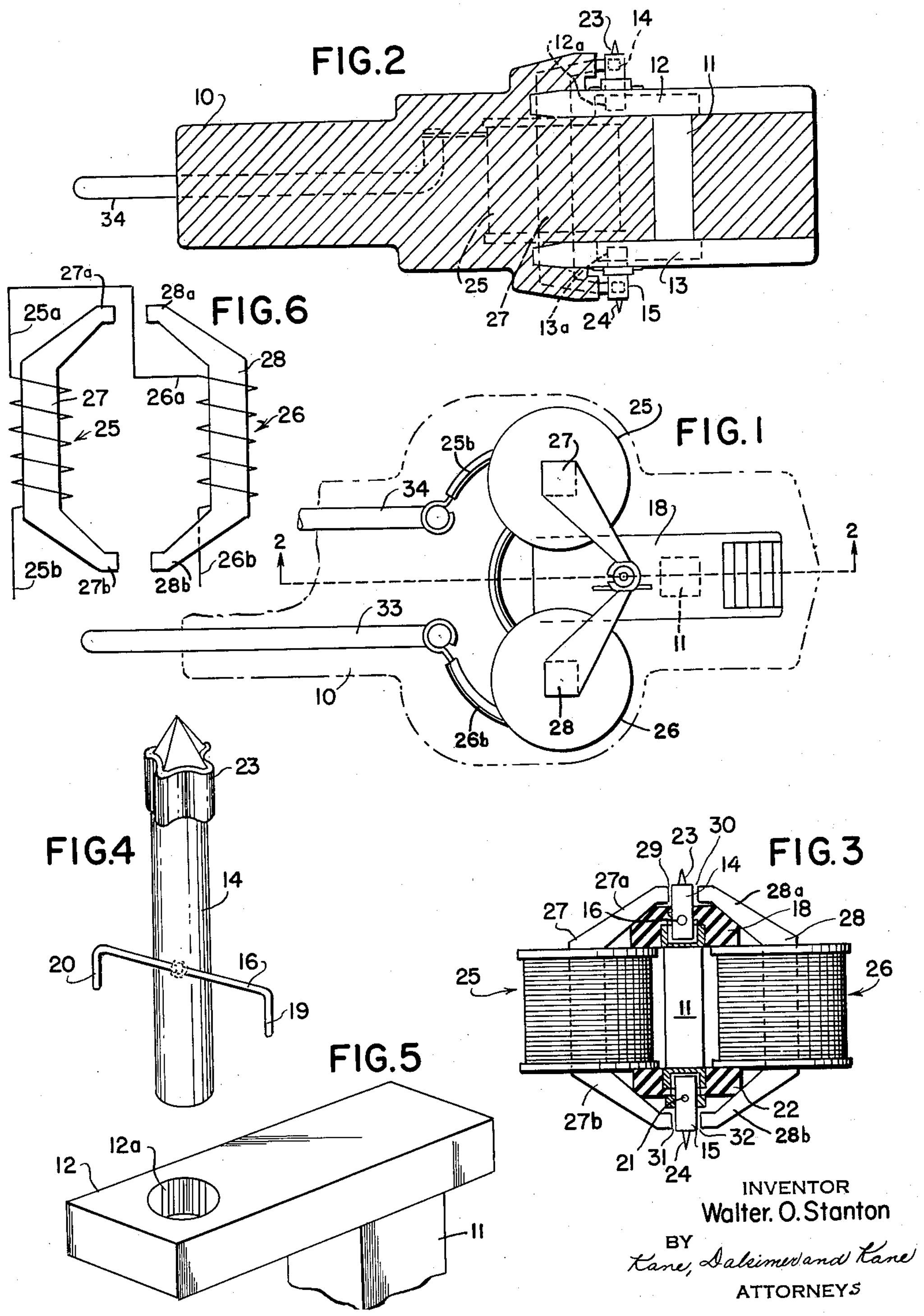
FIG. 1 is a plan view of a magnetic pickup device embodying my invention.
FIG. 2 is a longitudinal sectional view taken in the direction of the arrows on the line 2—2 of FIG. 1.
FIG. 3 is a partially sectional view showing the magnetic path of my pickup device and portions of the mounting therefor.
FIG. 4 is a perspective view of the armature and stylus together with the supporting torsion wire showing the manner in which the armature is mounted on the torsion wire.
FIG. 5 is a perspective view of the magnetic coupling member.
FIG. 6 is a partially sectional view showing the electrical connections of my pickup device together with portions of the magnetic path and mounting therefor.

The pickup supporting structure shown generally in the figures as 10 is molded or cast from a suitable dielectric plastic material or casting resin such as phenolic resin, ureas, nylon or polystyrene. The supporting structure is molded so as to conveniently embrace and support the several parts of the pickup unit (aside from the moving system) and so as to present a pleasing external appearance.

Permanent magnet 11 is embedded in and supported by body 10. Magnet 11 is a dual pole magnet substantially rectangular in shape. Adjacent the ends of magnet 11 are situated coupling members 12 and 13. These coupling members are identical rectangular pieces constructed of high magnetic permeability metal, each having a cylindrical recess extending through it near the end which is furthest from magnet 11. Thus, coupling member 12 which is shown in detail in FIG. 5 has cylindrical recess 12*a* extending therethrough while coupling member 13 has cylindrical recess 13*a* extending through it.

Inserted in openings 12*a* and 13*a* are the ends of armatures 14 and 15 respectively. Armature 14 which is identical with armature 15 is shown in greater detail in FIG. 4 of the drawings. This armature is tubular in shape and constructed of material of high magnetic permeability such as soft iron or a nickel-iron alloy. Armatures 14 and 15 since they are inserted in the recesses are mounted in inductive relationship with respect to coupling members 12 and 13 respectively and are mounted so that they can oscillate with respect thereto without engaging the coupling members.

The armature supporting member preferably takes the form of a relatively stiff resilient torsion wire 16, shown in FIG. 4, made of music wire, beryllium copper or other spring metal although it is preferred that a magnetic material be employed. The torsion wire extends through the armature and is safely secured thereto in some suitable manner so that the armature and wire oscillate or rotate as a unit. Thus in FIG. 4. the portion of the wire disposed adjacent the armature is soldered thereto at 17. This arrangement provides an armature which is light in weight. The moving system is then of extremely low mass and adds greatly to the life of phonograph records used in conjunction therewith.

The torsion wire extends perpendicularly to the axis of armature 14 and at two points displaced from the opposite sides thereof, the wire is formed into the offset angular end portions 19 and 20 which are fixedly secured to slide member 18 so as to prevent rotation of wire 16 by being embedded therein. Armature 15 is likewise connected and supported by torsion wire 21 embedded in supporting slide member 22.

It will thus be seen that each armature is supported by its respective torsion wire in a normal position of rest with the inner ends disposed in the recesses in the coupling members and with the outer ends extending therefrom so that the armatures are free to oscillate laterally with the torsion wires serving as the axis of oscillation, and also serving as centering springs to return the armatures to their normal positions of rest when a displacing force is removed.

Stylus 23 is rigidly connected to armature 14 as shown in FIG. 4 and stylus 24 is likewise connected to armature 15. These styluses are common in the art and usually constructed of jeweled material but may be constructed of other material if so desired.

The armature assembly which is embedded in the slide member comprises the moving system and may be replaced when a stylus is worn down from use by removing the slide member from supporting structure 10. The replaceable stylus assembly may be inserted and removed by sliding the slide member into and out of a channel or the like from the free end of supporting structure 10.

Also embedded in the pickup supporting structure diametrically opposite one another are coil assemblies 25 and 26. The coil assemblies are so located in the supporting structure for purposes of balance and such location is not necessary for the proper utilization of my invention.

Core 27 extends centrally through coil 25 and core 28 extends through coil 26. Both of these cores are constructed from a material of high magnetic permeability. The cores 27 and 28 are provided with extensions at either end which project angularly toward the armatures and serve as pole pieces. Thus core 27 is provided with extension **27*a* projecting toward armature 14 and extension 27*b* projecting toward armature 15, and core 28 is provided with extension 28*a* projecting toward armature 14, while extension 28*b* projects toward armature 15**. It will be noted that the extremities of these projections are closest to the armatures at the ends thereof where the styluses are attached.

Therefore, a magnetic path exists whereby flux can flow from permanent magnet 11 through coupling member 12 thence to armature 14 and then across air gaps 29 and 30 to cores 27 and 28 and across air gaps 31 and 32 to armature 15, coupling member 13 and back to permanent magnet 11.

Considering FIG. 6, it can be observed that coils 25 and 26 which are physically wound in the same direction are electrically connected in series opposition. Because of the winding of the individual coils flux flowing in the same directions in the cores of coils 25 and 26 will induce voltages in each of these coils having the same polarity. Thus, if the flux flowed downwardly in cores 27 and 28 as shown in the figures, leads **25*a* and 26*a* (which are the uppermost leads of coils 25 and 26 respectively) would be positively charged with respect to leads 25*b* and 26*b* (which are the lowermost leads of coils 25 and 26 respectively). Since I connect lead 25*a* to lead 26*a*, the potentials developed across coils 25 and 26 by the downward flow of flux is cancelled and the resultant potential between leads 25*b* and 26*b* is zero. However, if voltages of the same magnitude but opposite polarity were generated in coils 25 and 26, by flow of equal quantities of flux upwardly in core 27 and downwardly in core 28, the resultant voltage measured between leads 25*b* and 26*b*** would be twice the voltage generated in either coil individually.

In using my pickup, it is assembled with a phonograph tone arm in the usual manner and leads **25*b* and 26*b* are connected to the amplifying system of the phonograph through connectors 33 and 34. The stylus of one of the armatures is applied to the groove of a laterally cut record which is to be sensed. Because of this the armature is oscillated in response to the modulation of the record groove. Since the armature of that stylus is located in the magnetic path, oscillations of the stylus result in a change in the magnetic path. Thus, if stylus 23 were applied to the grooves of a record, armature 14 would oscillate in response thereto and the widths of air gaps 29 and 30 would be continuously changed thereby changing the amount of flux flowing in core pieces 27 and 28**.

The magnetic path is therefore continually changing in response to the grooves on a record as sensed by the stylus and the flux flowing in cores 27 and 28 is continually increasing or decreasing in synchronism with the oscillations of the armature. If stylus 23 is being used and armature 14 moves closer to extension **28*a* in response to the movement of the stylus, thus decreasing the width of air gap 30 and increasing the width of air gap 29, the amount of flux flowing in core 28 increases while the flux flowing in core 27** decreases by an equal amount.

The change of flux acts to generate a voltage in the coils associated with these cores. Thus, an increase of flux flowing in the core of coil 26 tends to generate a voltage in coil 26 of positive polarity while a decrease in the flux flowing in the core of coil 25 generates a voltage of negative polarity in coil 25. Because these coils are wound and connected as heretofore described, the voltage generated in one is subtracted from the voltage generated in the other and since one is a negative polarity voltage, a summation of the two appears at leads **25*b* and 26*b* and is transmitted to the amplifying system through connectors 33 and 34**.

Because the coils are mounted in this manner, extraneous noise signals "picked up" from the atmosphere and which cut across the coils will generate the same polarity voltage in each coil. Since the coils are wound in series opposition for voltages having the same polarity, noise rejection will be accomplished.

Utilization of my invention therefore results in a decrease of noise in the acoustic output since these undesired signals are eliminated prior to amplification while the intensity of the desired signal is doubled. This results in extremely accurate reproduction of high fidelity signals.

Thus, among others, the several objects of the invention as specifically aforenoted are achieved. Obviously, numerous changes in construction and rearrangement of parts might be resorted to without departing from the spirit of the invention as described by the claims.

I claim:

1. In a phonograph pickup of the magnetic type: a supporting structure; a magnetic system including a single elongated permanent magnet vertically disposed in the supporting structure, parallel identical coupling members formed of magnetic permeable material horizontally disposed in the supporting structure, substantially flat facing surfaces of said coupling members, a recess formed in each of said flat surfaces, an end of said permanent magnet adjacent one of said coupling members, a remaining end of said permanent magnet adjacent the remaining coupling member, a vertically disposed pivotally mounted stylus supporting armature supported by said supporting structure with an end thereof within the recess of one of said coupling members, a second stylus supporting armature pivotally supported by said supporting structure on the axis of said first stylus supporting armature with an end thereof within the recess of the remaining coupling member, parallel elongated magnetic cores vertically disposed in said supporting structure, each of said coupling members providing a magnetic path which is a fraction of the magnetic path provided by each of said magnetic cores, first ends of said cores extending outwardly of one of said coupling members and projecting toward and in inductive relationship with said first stylus supporting armature and equally spaced therefrom, second ends of said cores extending outwardly of the remaining coupling member and projecting toward and in inductive relationship with said second stylus supporting armature and equally spaced therefrom, means supporting said armature on said supporting structure, and a generating coil on each of said cores responsive to changes in the quantity of magnetic flux passing therethrough.

2. In a phonograph pickup of the magnetic type: a supporting structure; a magnetic system including a single elongated permanent magnet vertically disposed in the supporting structure, parallel identical coupling members formed of magnetic permeable material horizontally disposed in the supporting structure, substantially flat facing surfaces of said coupling members, a recess formed in each of said flat surfaces, an end of said permanent magnet adjacent one of said coupling members, a remaining end of said permanent magnet adjacent the remaining coupling member, a vertically disposed pivotally connected stylus supporting armature supported by said supporting structure with an end thereof within the recess of one of said coupling members, a second stylus supporting armature pivotally supported by said supporting structure on the axis of said first stylus supporting armature with an end thereof within the recess of the remaining coupling member, parallel elongated cores vertically disposed in said supporting structure, each of said coupling members providing a magnetic path which is a fraction of the magnetic path provided by each of said magnetic cores, first ends of said cores extending outwardly of one of said coupling members and projecting toward and in inductive relationship with said first stylus supporting armature and equally spaced therefrom, second ends of said cores extending outwardly of the remaining coupling member and projecting toward and in inductive relationship with said second stylus supporting armature and equally spaced therefrom, means supporting said armatures on said supporting structure, and a pair of identical generating coils mounted on said cores responsive to changes in the amount of magnetic flux passing therethrough and connected in electrical opposition to one another.

References Cited in the file of this patent

UNITED STATES PATENTS

| | | |
|---|---|---|
| 2,444,336 | Cornwell | June 29, 1948 |
| 2,456,388 | Cornwell | Dec. 14, 1948 |
| 2,485,432 | Cornwell | Oct. 18, 1949 |
| 2,917,590 | Stanton | Dec. 15, 1959 |

FOREIGN PATENTS

| | | |
|---|---|---|
| 334,551 | Great Britain | Sept. 5, 1930 |